(12) United States Patent
Uppala et al.

(10) Patent No.: US 8,108,411 B2
(45) Date of Patent: Jan. 31, 2012

(54) METHODS AND SYSTEMS FOR MERGING DATA SETS

(75) Inventors: RadhaKrishna Uppala, Bellevue, WA (US); Joerg Harry Hallmann, Sammamish, WA (US)

(73) Assignee: Yahoo! Inc., Sunnyvale, CA (US)

( * ) Notice: Subject to any disclaimer, the term of this patent is extended or adjusted under 35 U.S.C. 154(b) by 462 days.

(21) Appl. No.: 11/855,358

(22) Filed: Sep. 14, 2007

(65) Prior Publication Data
US 2009/0077078 A1     Mar. 19, 2009

(51) Int. Cl.
*G06F 7/00* (2006.01)
(52) U.S. Cl. ...................................................... 707/752
(58) Field of Classification Search .................. 707/100, 707/752
See application file for complete search history.

(56) References Cited

U.S. PATENT DOCUMENTS
2005/0076018 A1* 4/2005 Neidecker-Lutz ................ 707/3
* cited by examiner

*Primary Examiner* — Apu Mofiz
*Assistant Examiner* — Ajith Jacob
(74) *Attorney, Agent, or Firm* — Greenberg Traurig, LLP

(57) ABSTRACT

Systems and methods for merging data sets are provided. Data sets are merged based upon a process which begins by sorting data sets. Data sets each include at least one data set key column storing at least one data set key column record. The key column record subsets include at least one data set key column record. Based upon the identification of the first and second key column record subsets, a working data set is assembled. The working data set includes at least the first and second key column record subset, a first and second last record indicator corresponding to the last record of the first and second key column record subset respectively, and a first and second position indicator associating the data set key column records with the data sets respectively. The working data set is sorted in accordance with a selected one or more key column record subsets.

14 Claims, 6 Drawing Sheets

METHODS AND SYSTEMS FOR MERGING DATA SETS

COPYRIGHT NOTICE

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Increasingly, an abundance of business intelligence data is gathered from the Internet and other information sources. Much of this data takes the form of information describing an action or occurrence (i.e., an event) that is typically generated by a user or a computer. Event data, including but not limited to data that may be associated with or derived from events, is often stored for later access, identification, manipulation, or use. In many cases, event data is stored in the form of records within one or more datastores, data sets or database files (e.g., in the form of tables). Data sets storing event data typically require significant amounts of storage space that may be spread across a plurality of networked storage devices.

Event data that is gathered from one or more information sources may be related or share common properties despite being stored in different data sets or residing at different network or storage locations. In order to access, identify, manipulate, or use commercially useful information, businesses typically build queries or provide instructions for extracting event data based upon the related or shared common properties of the event data. Commonly referred to as "data mining," this process typically, involves searching through numerous data sets that include one or more fields (i.e., primary key fields) that uniquely identify event data sharing common or related properties. Event data matching a certain query may then be extracted from the numerous databases.

Data mining is typically a processor-intensive activity. Even in distributed processing systems, where multiple computers may be linked in a network to perform the same work, processing of queries that span large and/or numerous data sets often require a significant number of CPU machine cycles. Particularly where queries request event data from a plurality of databases, the processing overhead may be enormous for merging and analyzing event data records across the plurality of databases.

In many circumstances, query results may be required in a timely manner (e.g., microseconds) or query results may be required so as to reduce utilization of one or more processors. In response to these and other requirements, many queries may make use of data that is pre-sorted. Pre-sorting data set information typically makes searching more efficient by organizing a collection of data into a sequenced order that may permit faster extraction of the data on the basis of the sequenced order. Despite some efficiency that may be gained by pre-sorting a data set, queries requesting event data from a plurality of data sets do not necessarily exhibit the same efficiency if the query directs a search of more than one sorted, yet un-merged, data set. Such queries may exhibit a high number of input/output operations or in-memory tree/scan operations that may degrade the performance of the query operations. Thus, there exists a need for methods and systems to efficiently merge event data that may comprise a plurality of data sets.

SUMMARY

Against this backdrop systems and methods have been developed for merging data sets. In one embodiment (which embodiment is intended to be illustrative and not restrictive), a method for merging data sets is provided. The method includes sorting a plurality of data sets including at least a first data set and a second data set, the first data set including at least one first data set key column storing at least one first data set key column record and the second data set including at least one second data set key column storing at least one second data set key column record. The method further includes identifying a first key column record subset and a second key column record subset, the first key column record subset including the at least one first data set key column record and the second key column record subset including the at least one second data set key column record. The method includes, based upon the identification of the first key column record subset and the second key column record subset, assembling a working data set including at least the first key column record subset and the second key column record subset, a first last record indicator corresponding to the last record of the first key column record subset, a second last record indicator corresponding to the last record of the second key column record subset, a first position indicator associating the first data set key column record with the first data set, and a second position indicator associating the second data set key column record with the second data set. The method further includes sorting the working data set in accordance with a selected one or more of the first key column record subset and second key column record subset. In an aspect of the method, the first key column record subset and the second key column record subset do not exceed a certain memory capacity. In another aspect of the method, the certain memory capacity corresponds to a cache size. In an aspect of the method, the first key column record subset equals the second key column record subset. In another aspect, the method further includes sorting a third data set, the third data set including at least one third data set key column storing at least one third data set key column record; identifying a third key column record subset, the third key column record subset including the at least one third data set key column record; and based upon the identification of the third key column record subset, assembling the working data set further including at least the third key column record subset, a third last record indicator corresponding to the last record of the third key column record subset, and a third position indicator associating the third data set key column record with the third data set. In an aspect of the method, the first data set key column stores a second first data set key column record. In another aspect of the method, the second first data set key column record duplicates the at least one first data set key column record. In an aspect of the method, the working data set further includes a duplicate record indicator corresponding to the first data set key column record, the duplicate record indicator identifying whether the second first data set key column record duplicates the at least one first data set key column record. In another aspect of the method, the working data set excludes the second first data set key column record. In an aspect of the method, the first position indicator identifies a location of the first data set and the second position indicator identifies a location of the second data set.

In another embodiment (which embodiment is intended to be illustrative and not restrictive), a computer-readable medium having stored thereon a data structure is provided. The computer-readable medium includes a first data field comprising a first instance of key data. The computer-readable medium further includes a second data field comprising data identifying a location of a second instance of the key data in a table including the second instance of the key data. In an aspect, the computer-readable medium further includes a third data field comprising data identifying a duplicate third instance of the key data in the table including the second instance of the key data. In another aspect, the computer-readable medium further includes a third data field comprising data identifying whether the first instance of key data corresponds to a last record indicator.

In another embodiment (which embodiment is intended to be illustrative and not restrictive), another method for merging data sets is provided. The method includes assembling a first working data set comprising a first portion of sorted key column records from a first sorted data set and a second portion of sorted key column records from a second sorted data set. The method further includes sorting the first working data set. The method includes identifying a first occurrence of a last record corresponding to either the first portion or the second portion of the first working data set. The method further includes determining whether one or more records following the last record are equivalent to the last record. The method includes, upon determining that the one or more records following the last record are equivalent to the last record, identifying a last record of the one or more records following the last record as a sorting cut-off point. In one aspect, the method further includes assembling a second working data set comprised of one or more records following the sorting cut-off point.

In another embodiment (which embodiment is intended to be illustrative and not restrictive), yet another method for merging data sets is provided. The method includes assembling a first working data set comprising a first portion of sorted key column records from a first sorted data set and a second portion of sorted key column records from a second sorted data set. The method further includes sorting the first working data set. The method includes identifying a last record corresponding to the first portion of the first working data set. The method further includes determining whether the record following the last record corresponding to the first portion of the first working data set is a last record corresponding to the second portion of the first working data set. The method includes, upon determining that the record following the last record corresponding to the first portion of the first working data set is a last record corresponding to the second portion of the first working data set, identifying the last record corresponding to the second portion of the first working data set as a sorting cut-off point.

In another embodiment (which embodiment is intended to be illustrative and not restrictive), a system for merging data sets is provided. The system includes a datastore that stores a plurality of data sets wherein each of the data sets include at least one key column comprised of associated data records. The system further includes a request module that requests a transformation of the associated data records of at least a portion of the plurality of the data sets stored within the datastore. The system includes a data transformation module that performs the steps of: sorting a plurality of data sets including at least a first data set and a second data set, the first data set including at least one first data set key column storing at least one first data set key column record and the second data set including at least one second data set key column storing at least one second data set key column record; identifying a first key column record subset and a second key column record subset, the first key column record subset including the at least one first data set key column record and the second key column record subset including the at least one second data set key column record; based upon the identification of the first key column record subset and the second key column record subset, assembling a working data set including at least the first key column record subset and the second key column record subset, a first last record indicator corresponding to the last record of the first key column record subset, a second last record indicator corresponding to the last record of the second key column record subset, a first position indicator associating the first data set key column record with the first data set, and a second position indicator associating the second data set key column record with the second data set; and sorting the working data set in accordance with a selected one or more of the first key column record subset and second key column record subset.

These and various other features as well as advantages will be apparent from a reading of the following detailed description and a review of the associated drawings. Additional features are set forth in the description which follows, and in part will be apparent from the description, or may be learned by practice of the described embodiments. While it is to be understood that both the foregoing general description and the following detailed description are exemplary and explanatory, the benefits and features will be realized and attained by the structure particularly pointed out in the written description and claims hereof as well as the appended drawings.

BRIEF DESCRIPTION OF THE DRAWINGS

The following drawing figures, which form a part of this application, are illustrative of embodiments systems and methods described below and are not meant to limit the scope of this disclosure in any manner, which scope shall be based on the claims appended hereto.

DETAILED DESCRIPTION

Figure 1:
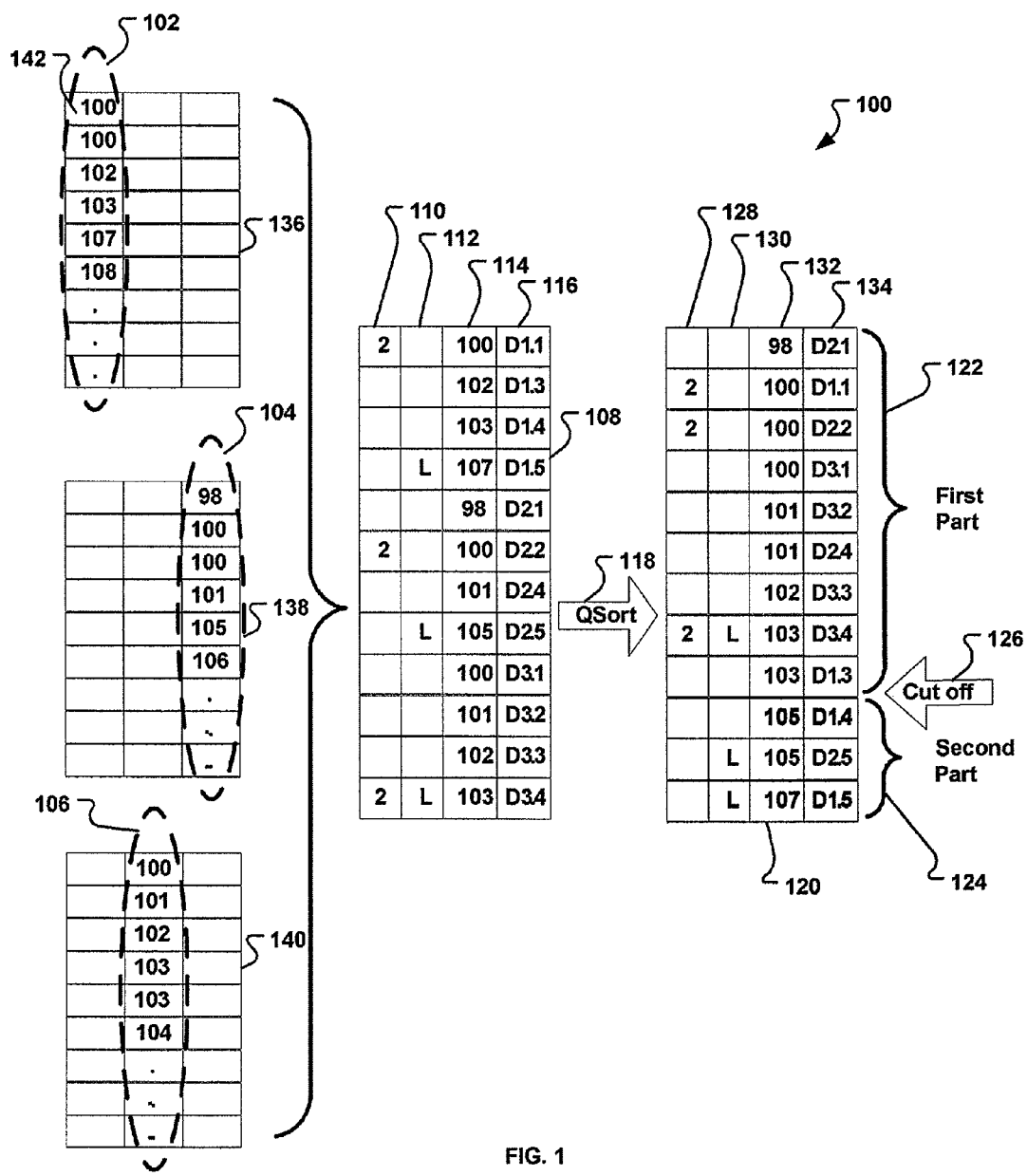
FIG. 1 is a schematic view illustrating an embodiment of a high-level data manipulation abstraction for merging data sets.

FIG. 1 is a schematic view illustrating an embodiment of a high-level data manipulation abstraction 100 for merging data sets. In one embodiment, the data manipulation abstraction 100 may be comprised of a first data set 136, second data set 138, and a third data set 140. Each of the data sets 136, 138, 140 may include one or more key columns 102, 104, 106 that are comprised of one or more key records 142. In an embodiment, the key records 142 may be sorted in the key column 102, 104, 106. One skilled in the art will recognize that many forms of sorting are possible, including but not limited to, arranging items in an ordered sequence or grouping together items with similar properties.

In the embodiment illustrated by FIG. 1, a set of key records 142 may be selected from each data set 136, 138, 140. For example, as set forth in FIG. 1, a set of key records 142 of a first data set 136 may be comprised of key column records "100," "100," "102," "103," and "107." As another example, as further set forth in FIG. 1, a set of key column records of a second data set 138 may be comprised of key column records "98," "100," "100," "101," and "105." As yet another example, as further set forth in FIG. 1, a set of key column records of a third data set 140 may be comprised of key column records "100," "101," "102," "103," and "103."

In the embodiment illustrated by FIG. 1, the data manipulation abstraction 100 illustrates assembly of certain sets of key column records in a working table 108. A working table 108 may be comprised of one or more duplicate record indicators 110. One skilled in the art will recognize that many ways of expressing duplicate records are possible and within the scope of this disclosure. By way of illustration and not of limitation, duplicate records may be identified by a number (e.g., a "2" may identify two duplicate records) or by one or more bits. A working table 108 may also be comprised of one or more last record indicators 112. One skilled in the art will recognize that many ways of expressing the last record or records are possible. For example, by way of illustration and not of limitation, last records of a set of records may be identified by the presence or absence of a bit or by a symbol (e.g., an "L" may indicate that the records corresponding to the "L" are the last in a set of records). In one embodiment, a last record indicator, together with location information, may comprise two (2) to four (4) bytes of memory. A working table 108, as set forth in the present embodiment, is further comprised of a working record set 114 of key records 142. For example, a working record set 114 may be comprised of copies of key records 142 or references (e.g., pointers) to key records 142. A working table 108, as set forth in the present embodiment, may be further comprised of one or more key record position locators 116. For example, a key record locator 116 may identify a data set 136, 138, 140 and the location or position of a key record 142 within the data set 136, 138, 140.

In the embodiment illustrated by FIG. 1, a working table 108 may be sorted by one or more processors according to a sorting algorithm 118. For example, as set forth in FIG. 1, a sorting algorithm 118 such as "QSort" or QuickSort may be used to sort the working record set 114 of the working table 108. As another example, groups of key records 142 that comprise a working record set 114 may also be sorted. In one embodiment, sorting a working table 108 results in merging sorted key records into a sorted results table 120. In another embodiment, a working table 108 may itself be reordered in-place so as not to create a new table within memory. In an embodiment, a sorted results table 120 includes duplicate record indicators 128, last record indicators, and record position locators 134 sorted according to the sorted record set 132. In one embodiment, where a QuickSort sorting algorithm 118 is used to sort the record set 132, the record set 132 may comprise a sorted first part 122, a sorted second part 124, and a cut off point 126. In this embodiment, the cut off point 126 may identify one or more records (e.g., records "103") for which all prior sorted records, collectively the sorted first part 122, comprise a complete set of sorted key records 142 for all data sets 136, 138, 140. Further, a sorted second part 124 may indicate sorted key records 142 for which there may still exist additional records (e.g. "106" in data set 138 of FIG. 1) in data sets 136, 138, 140 that are not yet sorted and merged within the sorted results table 120. In another embodiment, where an in-place sorting algorithm 118 of working table 108 is utilized, a bit or other indicator may identify a cut off point 126.

Figure 2:
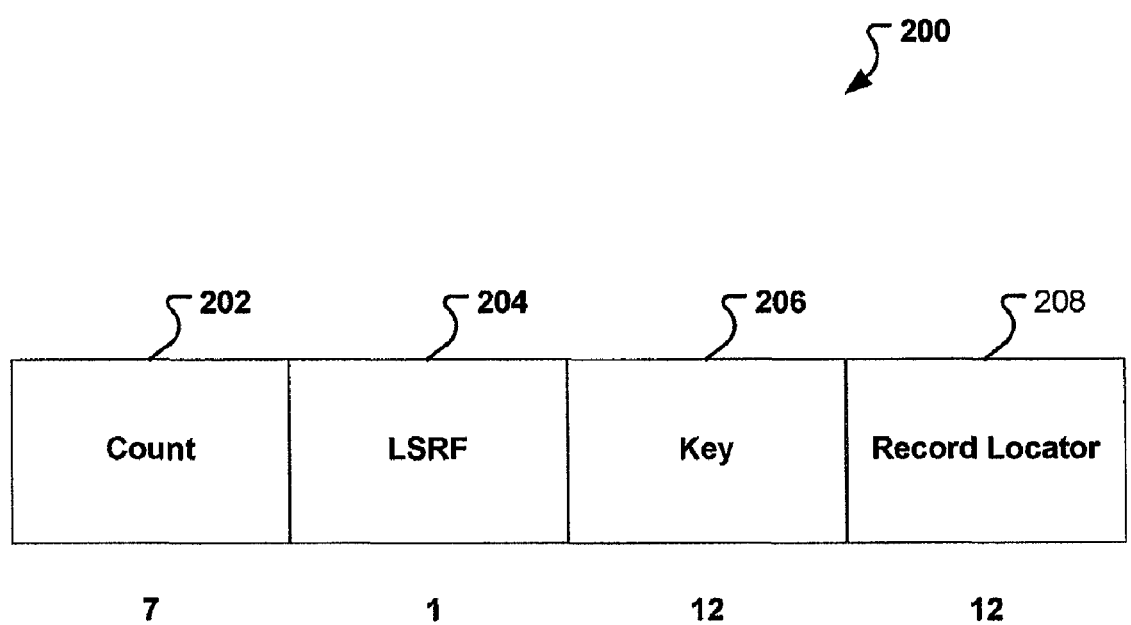
FIG. 2 is a schematic view illustrating an embodiment of a data structure for merging data sets.

FIG. 2 is a schematic view illustrating an embodiment of a data structure 200 for merging data sets. As set forth in the embodiment illustrated by FIG. 2, a data structure may be comprised of a set of bits (e.g., a 32-bit word) that represent one or more data fields that may correspond to a processing capacity and/or memory capacity. In one embodiment, a 32-bit data structure 200 is comprised of a 7-bit count field 202, a 1-bit last selected row flag field 204, a 12-bit key field 206 and a 12-bit record locator field 208. In one aspect, a count field 202 comprises data identifying a count of a plurality of instances of associated key data. In another aspect, a last selected row flag field 204 comprises data identifying whether the an instance of key data corresponds to a last record indicator. For example, a single bit may indicate that the key data within a 32-bit word corresponds to the last data record of an associated set of data records. In one embodiment, a data structure 200 may comprise a word-length associated with a certain processing capacity (e.g., 64-bit processor) or a certain memory capacity (e.g., utilizing an L1 and/or L2 cache architecture). For example, in an effort to speed of sorting, a data structure 200 may sized such that it occupies an L1 or L2 cache or another memory structure.

Figure 3:
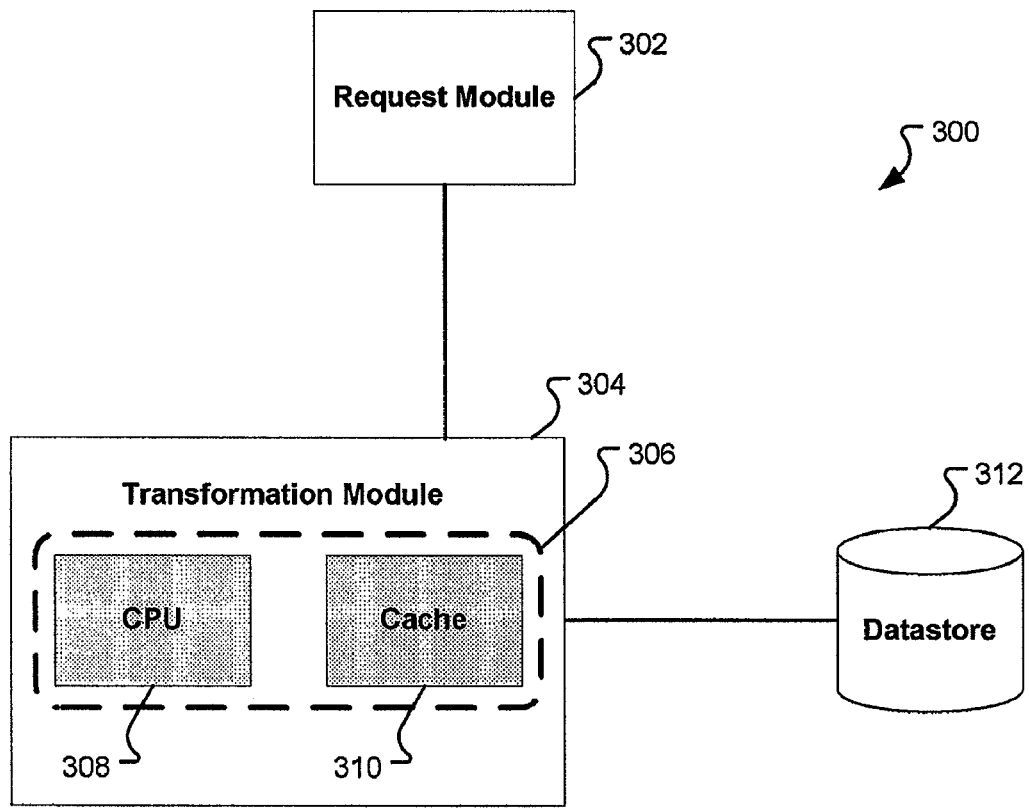
FIG. 3 is a schematic view illustrating a system for merging data sets.

FIG. 3 is a schematic view illustrating a system 300 for merging data sets. In one embodiment, the system 300 comprises datastore 312 that stores a plurality of data sets wherein each of the data sets include at least one key column comprised of associated data records. The datastore 312 may be comprised of one or more storage devices that may be operatively connected to one another via a network. One skilled in the art will recognize that many storage devices are possible, including but not limited to distributed storage devices (e.g., a RAID array of hard disk drives) and individual storage devices (e.g., volatile and non-volatile memory devices).

In one embodiment, a system 300 further comprises a request module 302 that requests a transformation of the associated data records of at least a portion of the plurality of the data sets stored within the datastore 312. Requests may take many forms, including but not limited to user requests, event-driven requests and requests generated according to a certain script or algorithm. For example, a user may request transformation of the associated data records, an aggregation of a certain number of data records and/or data sets may trigger a transformation request, or a request may be generated according to a predetermined transformation request script (e.g., requesting transformation after a time period). One skilled in the art will recognize that many forms and types of transformation requests are possible and within the scope of this disclosure.

In one embodiment, a system 300 further comprises a data transformation module 304 that performs the steps of: sorting a plurality of data sets including at least a first data set and a second data set, the first data set including at least one first data set key column storing at least one first data set key column record and the second data set including at least one second data set key column storing at least one second data set key column record; identifying a first key column record subset and a second key column record subset, the first key column record subset including the at least one first data set key column record and the second key column record subset including the at least one second data set key column record; based upon the identification of the first key column record subset and the second key column record subset, assembling a working data set including at least the first key column record subset and the second key column record subset, a first last record indicator corresponding to the last record of the first key column record subset, a second last record indicator corresponding to the last record of the second key column record subset, a first position indicator associating the first data set key column record with the first data set, and a second position indicator associating the second data set key column record with the second data set; and sorting the working data set in accordance with a selected one or more of the first key column record subset and second key column record subset. The data transformation module 304 may be comprised of one or more processing units 306 that may include one or more processors 308 and caches 310. One skilled in the art will recognize that a processing unit 306 may take many forms, including but not limited to one or more on-chip caches 310 and one or more single and/or multiple core processors 308. One skilled in the art will also recognize that processing within data transformation module 304 may be distributed among one or more networked computing devices.

Figure 4:
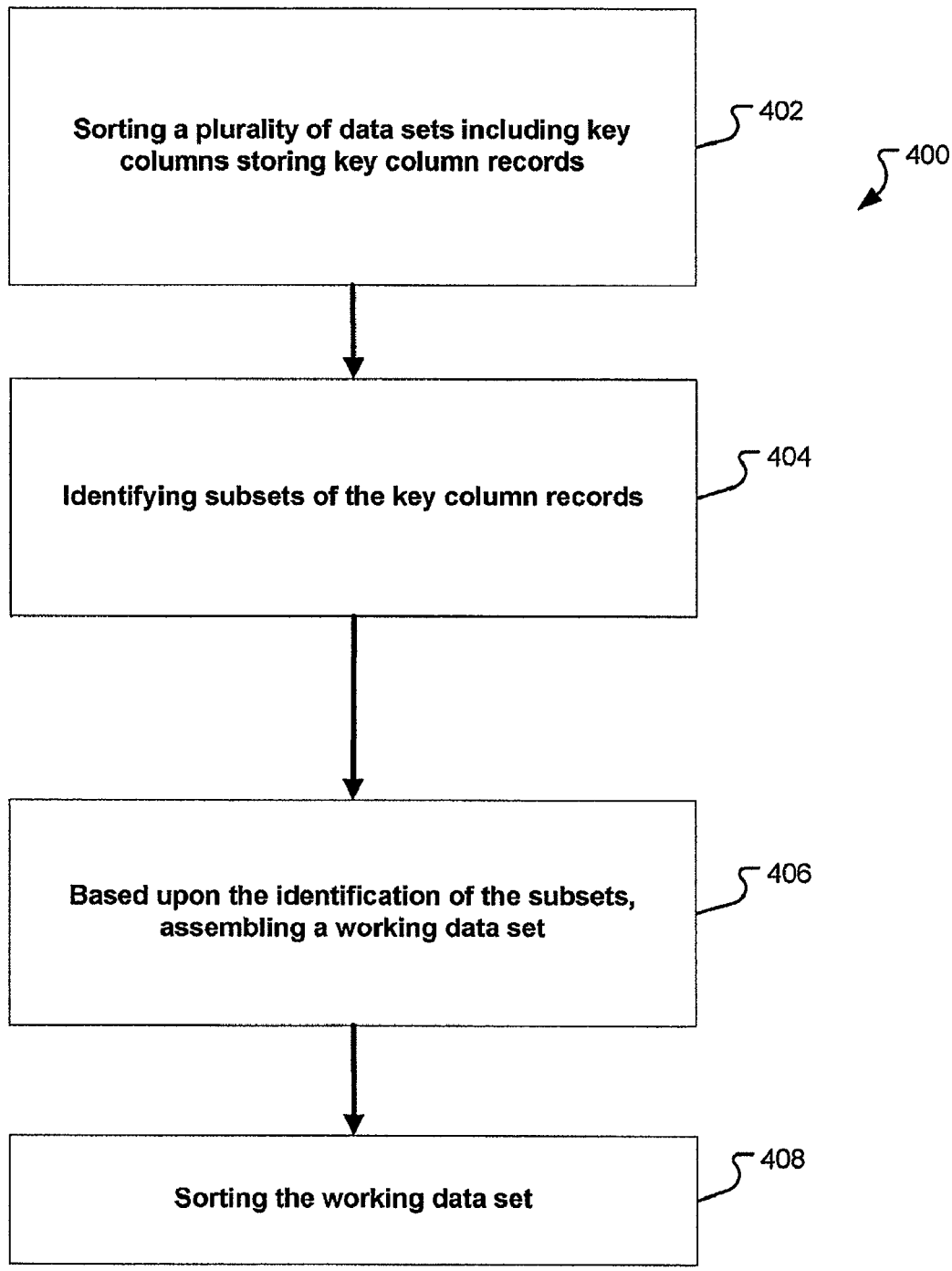
FIG. 4 is a block diagram illustrating an embodiment of a method for merging data sets.

FIG. 4 is a block diagram illustrating an embodiment of a method 400 for merging data sets. In the method 400, a plurality of data sets including at least a first data set and a second data set is sorted in sorting operation 402, the first data set including at least one first data set key column storing at least one first data set key column record and the second data set including at least one second data set key column storing at least one second data set key column record. In one embodiment, the first data set and second data set is sorted according to, respectively, the first data set key column records and the second data set key column records.

The method 400 further comprises identifying a first key column record subset and a second key column record subset in an identifying operation 404, the first key column record subset including the at least one first data set key column record and the second key column record subset including the at least one second data set key column record. For example, for each sorted input partition or table, approximately the same number of records may be identified from the top of the remaining rows in the partition or table. The number of records (e.g., key records) identified from each partition or table may be the number of records that may fit into the working table divided by the number of partitions or tables participating in the merge process. In one embodiment, all records in a data set may be identified and/or retrieved, while in another embodiment (as discussed previously) a portion of records (e.g., key column records are identified and/or retrieved. One skilled in the art will recognize that identification of a first key column record subset and a second key column record subset may include, but is not limited to, identifying a certain number of records within a data set or identifying a set of records sufficient to occupy at least a portion of a memory capacity.

The method 400 further comprises, based upon the identification of the first key column record subset and the second key column record subset, assembling in an assembling operation 406 a working data set including at least the first key column record subset and the second key column record subset, a first last record indicator corresponding to the last record of the first key column record subset, a second last record indicator corresponding to the last record of the second key column record subset, a first position indicator associating the first data set key column record with the first data set, and a second position indicator associating the second data set key column record with the second data set. For example, a working set may be sized such that it is large enough to accommodate all key column record subsets at once. As another example, a working table may be comprised of multiple sub-tables or child tables that permit assembly of the respective data subsets. One skilled in the art will recognize that many forms of assembling a working data set are possible, including but not limited to assembly of a working data set comprised of data records and/or data record references.

The method 400 further includes sorting the working data set in accordance with a selected one or more of the first key column record subset and second key column record subset in a sorting operation 408. In an aspect of the method 400, the first key column record subset and the second key column record subset may not exceed a certain memory capacity. In another aspect of the method 400, the certain memory capacity may correspond to a cache size. In an aspect of the method 400, the first key column record subset may equal the second key column record subset. In another aspect, the method 400 may further includes sorting a third data set, the third data set including at least one third data set key column storing at least one third data set key column record; identifying a third key column record subset, the third key column record subset including the at least one third data set key column record; and based upon the identification of the third key column record subset, assembling the working data set further including at least the third key column record subset, a third last record indicator corresponding to the last record of the third key column record subset, and a third position indicator associating the third data set key column record with the third data set. In yet another aspect of the method 400, the first data set key column may store a second first data set key column record. In another aspect of the method 400, the second first data set key column record duplicates the at least one first data set key column record. In still yet another aspect of the method 400, the working data set may further include a duplicate record indicator corresponding to the first data set key column record, the duplicate record indicator identifying whether the second first data set key column record duplicates the at least one first data set key column record. In another aspect of the method 400, the working data set may exclude the second first data set key column record. In another aspect of the method 400, the first position indicator may identify a location of the first data set and the second position indicator identifies a location of the second data set.

Figure 5:
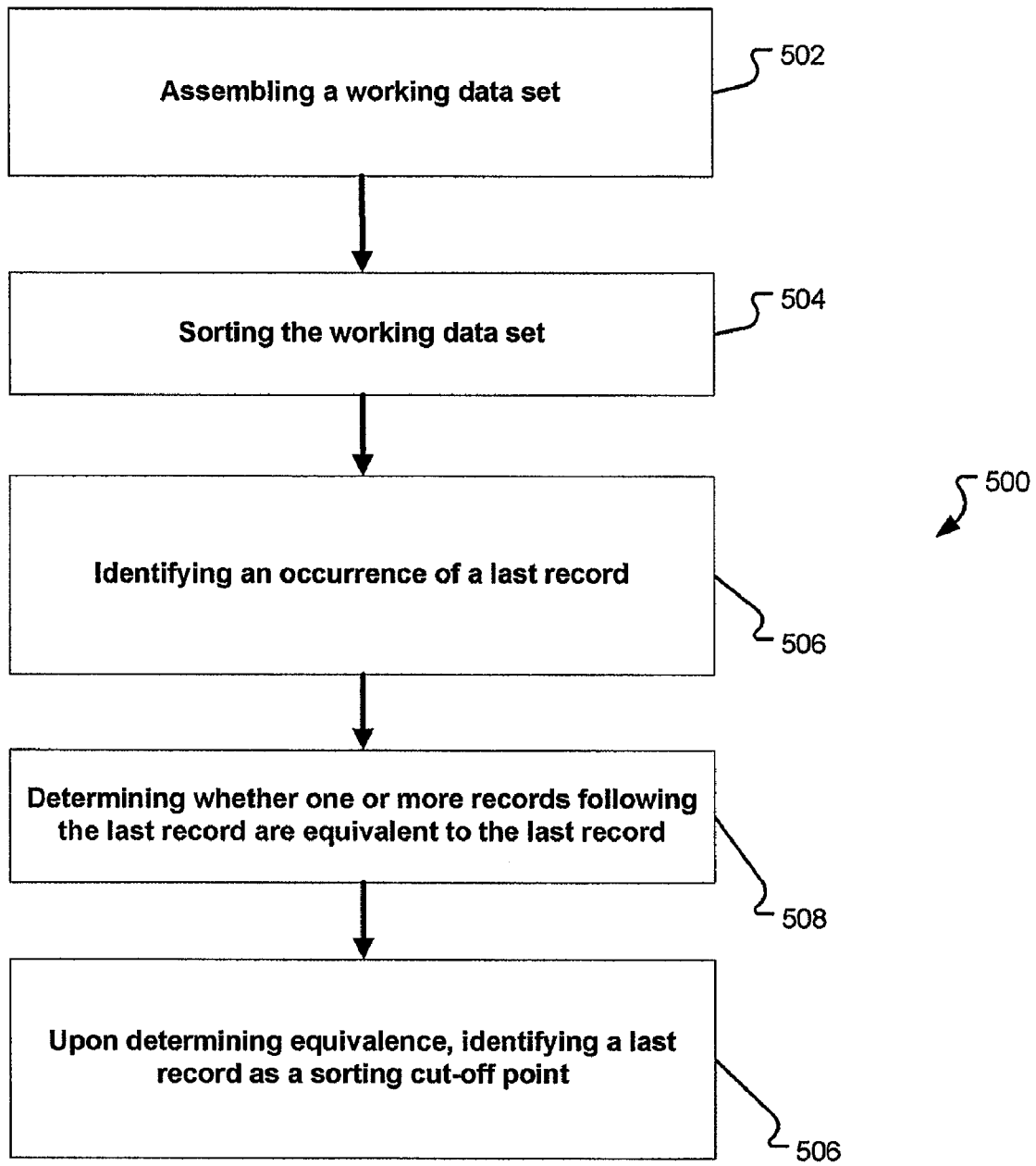
FIG. 5 is a block diagram illustrating an embodiment of a method for merging data sets.

FIG. 5 is a block diagram illustrating an embodiment of a method 500 for merging data sets. In the method 500, an assembly operation 502 assembles a first working data set comprising a first portion of sorted key column records from a first sorted data set and a second portion of sorted key column records from a second sorted data set. The method 500 further includes sorting the first working data set in a sorting operation 504. The method 500 then includes identifying a first occurrence of a last record corresponding to either the first portion or the second portion of the first working data set in an identifying operation 506. The method 500 further comprises determining whether one or more records following the last record are equivalent to the last record in a determining operation 508. The method 500 then includes, upon determining that the one or more records following the last record are equivalent to the last record, identifying a last record of the one or more records following the last record as a sorting cut-off point in an identifying operation 506. In one aspect, the method 500 further includes assembling a second working data set comprised of one or more records following the sorting cut-off point.

Figure 6:
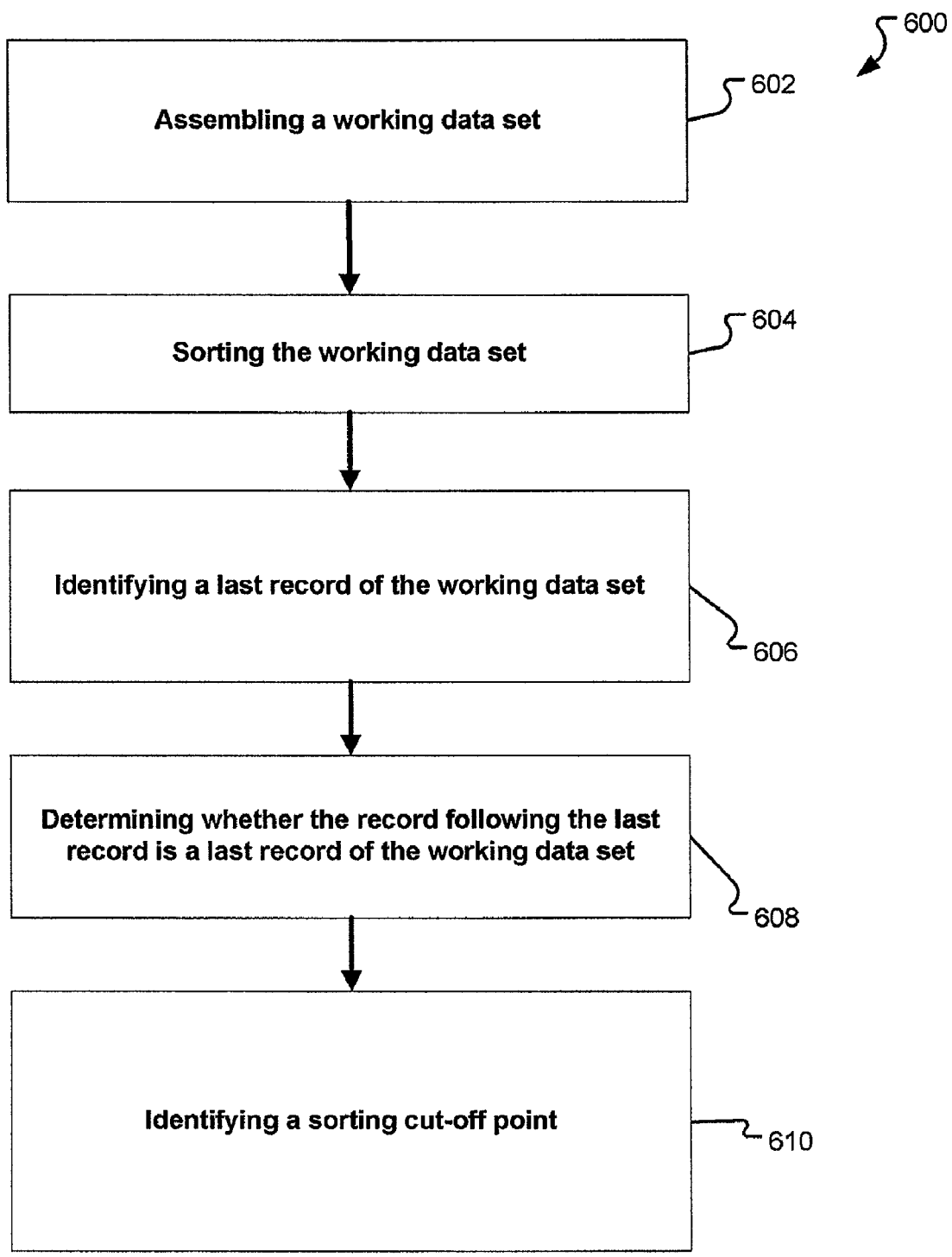
FIG. 6 is a block diagram illustrating an embodiment of a method for merging data sets.

FIG. 6 is a block diagram illustrating an embodiment of a method 600 for merging data sets. In the method 600, an assembly operation 602 comprises assembling a first working data set comprising a first portion of sorted key column records from a first sorted data set and a second portion of sorted key column records from a second sorted data set. The method 600 further includes sorting the first working data set in a sorting operation 604. The method 600 then comprises identifying a last record corresponding to the first portion of the first working data set in an identifying operation 606. The method 600 further comprises determining whether the record following the last record corresponding to the first portion of the first working data set is a last record corresponding to the second portion of the first working data set in a determining operation 608. The method 600 then includes, upon determining that the record following the last record corresponding to the first portion of the first working data set is a last record corresponding to the second portion of the first working data set, identifying the last record corresponding to the second portion of the first working data set as a sorting cut-off point in an identifying operation 610.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present disclosure. Numerous other changes may be made which will readily suggest themselves to those skilled in the art and which are encompassed in the spirit of this disclosure and as defined in the appended claims.

What is claimed is:

1. A method comprising:
   sorting, via a computing device, a plurality of data sets including at least a first data set and a second data set, the first data set comprising at least one first data set key column storing a plurality of first records, the second data set comprising at least one second data set key column storing a plurality of second records, each key column comprises information identifying a location of each of the plurality of records within the respective data set, the location information for the first key column corresponds to a first position indicator that associates the first data set key column with the first data set and a second position indicator that associates the second data set key column with the second data set;
   identifying, via the computing device, a first record subset and a second record subset based on the respective key column, the first record subset comprising a first number of sorted first records and the second record subset comprising a second number of sorted second records;
   assembling, via the computing device, the first record subset and the second record subset into a working data set based in part on each of the key columns for the respective data sets and the respective number of sorted records in each respective record subset, wherein the respective number of sorted records in each record subset are based upon the other subset and capacity of the working data set, the working data set comprising the first record subset, the second record subset, a first last record indicator corresponding to a last record of the first record subset, and a second last record indicator corresponding to a last record of the second record subset;
   associating, via the computing device, each record in the working data set with a working data set position indicator, the working data set position indicator identifying the data set and the location within the data set from which the record was obtained, the working data set position indicator based on the first and second position indicators; and
   sorting, via the computing device, the working data set.

2. The method of claim 1 wherein the first number and second number are chosen based on a memory capacity.

3. The method of claim 2 wherein the memory capacity corresponds to a cache size.

4. The method of claim 1 wherein the first number and second number are equal.

5. The method of claim 1 further comprising:
   sorting a third data set, the third data set comprising at least one third data set key column storing a plurality of third records;
   identifying a third record subset, the third record subset comprising at least some of the sorted third records; and
   wherein assembling the working data set further includes assembling the first record subset, the second record subset and the third record subset into a working data set, the working data set comprising the first record subset, the second record subset, the third record subset, a first last record indicator corresponding to a last record of the first record subset, a second last record indicator corresponding to a last record of the second record subset and a third last record indicator corresponding to a last record of the third record subset.

6. The method of claim 1 wherein at least two of the first records in the first record subset are duplicate records and assembling further comprises:
   including only one of the at least two duplicate records in the working data set; and
   identifying the only one of the at least two duplicate records with a duplicate record indicator.

7. A non-transitory computer-readable storage medium having tangibly stored thereon computer executable instructions, that when executed by a computing device, implement a data structure, comprising:
   a first data field comprising a first instance of a key record, the key record comprising a number of sorted data records, the number of sorted data records stored according to a key column that comprises information identifying a location of each of the number of sorted data records within the key record; and
   a second data field comprising data identifying a location of the key record in a table, wherein the location of the key record and the number of sorted data records are utilized in compiling a working data field based in part on the key column for number of sorted data records comprised within the key record and at least one other key record, wherein the number of sorted records are based upon the at least one other key record and capacity of the working data field, the key record corresponds to a position indicator that associates the first data field with the second data field, in that key columns comprised within each data field within the working data field are associated with each respective data field, wherein each record in the working data field is associated with a working data set position indicator, the working data set position indicator identifying the key record and the location within the key record from which the record was obtained, wherein the number of sorted records within the working data field are based upon the other key record.

8. The non-transitory computer-readable storage medium of claim 7 further comprising:
a third data field comprising data indicating that at least one duplicate of the key record is contained in the table.

9. The non-transitory computer-readable storage medium of claim 7, wherein the key record is one of a sorted set of key records from the table, the sorted set having a first record and a last record, and the data structure further comprises:
a fourth data field comprising data identifying whether the first instance of the key record in the data structure is the last of the sorted set of key records from the table.

10. A system comprising:
a plurality of processors;
a datastore that stores a plurality of data sets wherein each of the data sets includes at least one key column comprised of associated data records, each key column comprises information identifying a location of each of the associated data records within the respective data set;
a request module implemented by at least one of said plurality of processors that requests a transformation of the associated data records of at least a portion of the plurality of the data sets stored within the datastore; and
a data transformation module implemented by at least one of said plurality of processors that performs the steps of:
sorting the plurality of data sets comprising at least a first data set and a second data set, the first data set comprising at least one first data set key column storing a plurality of first records and the second data set comprising at least one second data set key column storing a plurality of second records, each key column comprises information identifying a location of each of the plurality of records within the respective data set, the location information for the first key column corresponds to a first position indicator that associates the first data set key column with the first data set and a second position indicator that associates the second data set key column with the second data set;
identifying a first record subset and a second record subset based on the respective key column, the first record subset comprising a first number of sorted first records and the second record subset comprising a second number of sorted second records;
assembling the first record subset and the second record subset into a working data set based in part on each of the key columns for the respective data sets and the respective number of sorted records in each respective record subset, wherein the respective number of sorted records in each record subset are based upon the other subset and capacity of the working data set, the working data set comprising the first record subset, the second record subset, a first last record indicator corresponding to a last record of the first record subset, and a second last record indicator corresponding to a last record of the second record subset;
associating, via the computing device, each record in the working data set with a working data set position indicator, the working data set position indicator identifying the data set and the location within the data set from which the record was obtained, the working data set position indicator based on the first and second position indicators; and
sorting the working data set.

11. The system of claim 10 wherein the first number and second number are chosen by the data transformation module based on a memory available to the transformation module.

12. The system of claim 11 wherein the memory capacity corresponds to a cache size of a cache used by the transformation module.

13. The system of claim 10 wherein the first number and second number are equal.

14. The system of claim 10 wherein at least two of the first records in the first record subset are duplicate records and the transformation module includes only one of the at least two duplicate records in the working data set and identifies the only one of the at least two duplicate records with a duplicate record indicator.

* * * * *